COLOR TELEVISION DEMODULATING CIRCUIT

Filed June 22, 1954 2 Sheets-Sheet 1

INVENTOR.
ROLAND N. RHODES
BY [signature]
ATTORNEY

COLOR TELEVISION DEMODULATING CIRCUIT

Filed June 22, 1954 2 Sheets-Sheet 2

INVENTOR.
ROLAND N. RHODES
BY
[signature]
ATTORNEY 2,964,588
Patented Dec. 13, 1960

2,964,588

COLOR TELEVISION DEMODULATING CIRCUIT

Roland N. Rhodes, Levittown, Pa., assignor to Radio Corporation of America, a corporation of Delaware Filed June 22, 1954, Ser. No. 438,405
6 Claims. (Cl. 178—5.4)

The present invention relates to demodulating circuits, and more particularly to color demodulator and synchronous detector circuits of the type employed in color television receivers for producing both positive and negative polarity versions of the demodulated signal.

Color television provides the reproduction on the viewing screen of a receiver of not only the relative luminescence and brightness, but also the color hues and saturations of the details of the original scene. Complete cooperation between the transmitter and receiver is essential for the realization of color fidelity in the reproduced color images. As a result, much emphasis is placed on the development and utilization of simple but accurate demodulation circuits.

The electrical transfer of images in color may be accomplished by additive methods. Additive methods produce natural color images by breaking down the light from an object into a predetermined number of selected primary or component colors.

Color images may be transferred electrically by analyzing the light from an object into not only its image elements, as is accomplished by normal scanning procedure, but by also analyzing the light from elemental areas of the image into selected primary or component colors and thereby deriving therefrom a signal representative of each of the selected color components. A color image may be then reproduced at a remote point by appropriate reconstruction from a component color signal train.

Consider the precise nature of the color television signal which conforms to the standards which were authorized by the Federal Communications Commission on December 17, 1953.

The three primary colors, red, green and blue which are standard for color television do not appear equally bright because they are located in different parts of the spectrum and hence stimulate the brightness sensation by different amounts. If the three primaries are mixed in the right proportions, it is found that the green primary, which is located at the center of the visible spectrum, accounts for 59% of the brightness sensation, while the red and blue primaries account for only 30% and 11% respectively. Cross-mixing the red, blue and green primary signals yields a monochrome signal Y according to the equation $$Y=0.30R+0.59G+0.11B \qquad (1)$$

This signal is generated in accordance with the existing scanning standards; i.e., 525 lines, 60 fields per second, and 30 frames per second, and is treated exactly like a standard monochrome signal with respect to bandwidth and the addition of synchronizing and blanking pulses.

In order to produce color pictures for color television transmission to a color receiver, it is convenient to include with the luminance signal, the so-called color difference or chrominance signals. These chrominance signals are designated $R-Y$, $G-Y$, and $B-Y$ and indicate how each color in the televised scene differs from the monochrome color of the same luminance.

These color difference signals may be written in the following way to constitute a set of three independent signals:

$$R-Y=0.70R-0.59G-0.11B \qquad (2)$$
$$G-Y=-.30R+0.41G-0.11B \qquad (3)$$
$$B-Y=-0.30R-0.59G+0.89B \qquad (4)$$

where Y is described by Equation 1. These equations cannot be solved for R, G, and B in terms of $R-Y$, $G-Y$, and $B-Y$ but they may be solved to find any other chrominance signals in terms of the other two. For example $$G-Y=-0.51(R-Y)-0.19(B-Y) \qquad (5)$$

Two signals utilized for the signal transmission of color difference signals are called the I and Q signals respectively. The I signal is a wide band signal yielding information including that along the orange-cyan line while the Q signal is a narrow band signal describing color information along a green-purple line. The I and Q signals may be described in terms of $R-Y$ and $B-Y$ color difference signals by the following equations:

$$I=0.74(R-Y)-0.27(B-Y) \qquad (6)$$
$$Q=0.48(R-Y)+0.41(B-Y) \qquad (7)$$

The expression for Y in terms of R, G, and B may be substituted into Equations 6 and 7 to show I and Q as functions of red, green and blue as follows:

$$I=0.60R-0.28G-0.32B \qquad (8)$$
$$Q=0.21R-0.52G+0.31B \qquad (9)$$

These equations show how I and Q signals may be produced directly from the camera signal.

At the transmitting end of the signal the $R-Y$ and $B-Y$ may be obtained by cross-mixing the outputs of I and Q detectors according to the relationships:

$$R-Y=0.96I+0.62Q \qquad (10)$$
$$B-Y=1.10I+1.70Q \qquad (11)$$

The $G-Y$ signal needed to combine with the Y signal to control the green primary in the receiver may be obtained either by cross-mixing the $R-Y$ signal and the $B-Y$ signal or by cross-mixing the I and Q signals directly as is indicated by the following equation $$G-Y=-0.28I-0.64Q \qquad (12)$$

Thus it is evident that by proper utilization of the I and Q signals, the color information can be recovered at the receiver.

Consider now the method of sending the I and Q signals. It is well known that a sine wave can carry two independent sets of information by modulating it in amplitude with one set and in phase with the other or, what is essentially the same thing, by separating the sine wave into two components in quadrature and amplitude modulating each component with one set of information. Each modulation can then be recovered by heterodyning, modulating or sampling the modulating wave with a sine wave having the same frequency and phase as the carrier component carrying the desired modulation. This process is sometimes called synchronous detection and must not be confused with other forms of detection which recover the entire modulation envelope.

Therefore in practical operation, a color subcarrier is used; this color subcarrier is modulated in a manner which includes modulation by the I and Q signals respectively. In practice the frequency designated for the color subcarrier is 3.58 mc. This is a frequency substantially equal to that of an odd multiple of one-half the line scanning frequency. Since the spectral components of a standard television signal occur in groups at intervals of the line scanning frequency, by choosing the color subcarrier frequency at an odd multiple of one-half the line scanning frequency the color information will be interspersed with that of the luminance and picture information and a minimum of signal confusion will result.

In order that color difference signal information can be synchronously demodulated from the modulated color subcarrier, it is therefore necessary to transmit synchronizing information with the television signal. This synchronizing information is transmitted in the form of approximately 8 cycles of the 3.58 mc. signal which is located on the back porch of the horizontal synchronizing pulse. The phase of this synchronizing burst is 57° ahead of the I component phase (which leads the Q component by 90°). It can be shown that this phase is also 180° out of phase with respect to the $B-Y$ component of the signal; the choice of this value permits certain simplifications in receiver design.

In the reproducer which is to display the color information, use is made of the synchronizing information to produce an accurately synchronized locally generated continuous wave which is suitable for use in the process of synchronous detection. If, for example, I and Q signals are to be realized from the processes of synchronous detection, it follows from Equations 10, 11 and 12 that the synchronous detection process should also be extended so that I and Q signals of both positive and negative polarity are produced.

It is therefore an object of this invention to produce a simplified synchronous detector which produces detected signals having both positive and negative polarity; that is, a plus-minus synchronous detector or demodulator.

It is another object of this invention to provide a demodulator in a phase modulated subcarrier system for providing demodulated waves having both negative and positive polarity.

It is a further object of this invention to provide a synchronous detector circuit for a color television receiver which provides directly chrominance color-difference signals of both positive and negative polarity.

It is yet another object of this invention to provide for use in a color television receiver, a diode type of demodulator which provides positive and negative versions of the chrominance information being synchronously demodulated.

According to the invention a demodulator is utilized which has a pair of serially connected output circuits. By applying the chroma information and the local oscillator signal to the demodulator and by proper location of a fixed potential point relative to the serially connected output circuits, one output circuit is caused to develop a demodulated signal having one polarity with the other output circuit caused to develop the same signal but of reversed polarity relative to the fixed potential point.

In one form of the invention, a two-path type of diode synchronous detector circuit having an input and output terminal is utilized; the circuit is unbalanced in that each of the two diodes is connected in a direction opposite to the direction of the other. In each of the two paths the diodes are operated in conjunction with a bias network and a resonant circuit to provide signal demodulation in the following way. A resonant circuit which is excited by the local subcarrier source is caused to produce the negative polarity version of the subcarrier signal on the anode of one of the diodes with the positive polarity version of the subcarrier signal supplied to the cathode of the other diode in such a way that the two diodes though oppositely directed, will conduct at the same time. An input terminal on which is provided the chroma information is attached to the resonant circuit so that this chroma information which will be applied simultaneously to the diodes which are being driven by the subcarrier signal in the manner described.

The action of the diodes which conduct at the same time in conjunction with their bias networks will cause the diode demodulator circuit to sample the chroma envelope at times prescribed by the phase of the locally generated subcarrier signal thereby producing an output wave which is the color information related to the particular phase of the subcarrier being used. However, by utilizing a pair of resistance and condenser networks, one coupled from ground to the input terminal and one coupled from ground to the output terminal, the envelope sampling action of the diodes will yield a voltage across the resistance and condenser network, which is associated with the input terminal to form one polarity version of the demodulated color difference signal with an inverted polarity version of the demodulated color signal caused to appear across the resistance and condenser network which is connected to the output terminal.

Other and incidental objects of this invention will become apparent upon a reading of the following specification and a study of the drawing wherein.

Figure 1:
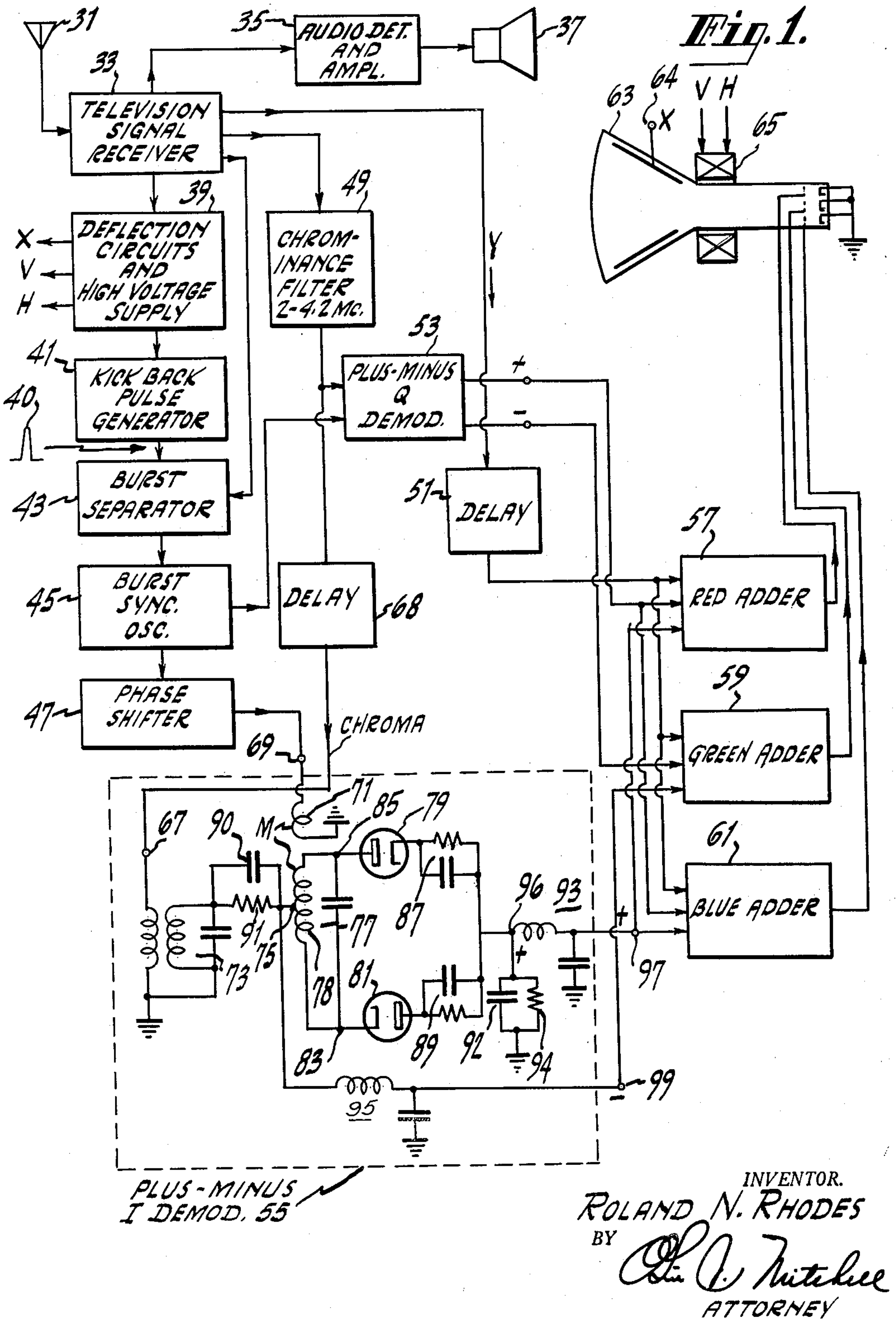
Figure 1 shows a block diagram of a color television receiver which employs the teachings of the present invention. Included in Figure 1 is the schematic diagram of a plus-minus I demodulator which illustrates one type of circuit which is suitable for use in color television receiver circuitry.

Consider the color television receiver circuit shown in Figure 1. Here the input color television signal arrives at the antenna 31 and is applied to the television signal receiver 33 at whose output the recovered color television signal is produced. The television signal receiver 33 combines the functions of first detection, intermediate frequency amplification, second detection, automatic gain control, and co-channel and adjacent channel interference suppression. Many of these aspects as related to television receiver operation are found discussed in Chapter 22 of the book "Harmonics, Sidebands and Transients in Communication Engineering" by C. Louis Cuccia as published by the McGraw-Hill Book Co., Inc., New York, in 1952.

The recovered color television signal contains the sound or audio information. This sound or audio information is transmitted on a separate carrier 4½ mc. removed from the picture carrier. By utilizing, for example, the well known principles of intercarrier sound this sound or audio information may be separated from the picture information in the audio detector and amplifier 35 from which circuit it is amplified and supplied to the loud speaker 37.

The picture information which issues from the television signal receiver 33 is applied to at least four branches of the color television receiver. One branch feeds the color television signal to the deflection circuits and high voltage supply 39 which provides vertical and horizontal deflection signals to the deflection yoke 65 and the high voltage signal to the ultor 64 of the color kinescope 63. In addition, the kickback pulse generator 41 which is usually an extra winding on the high voltage transformer in the deflection circuits and high voltage supply 39 is utilized which supplies a gate pulse 40 whose duration interval is adjusted to have an interval substantially that of the color synchronizing burst. The gate pulse 40 is supplied to the burst separator 43 to which is also supplied the color television signal. The output of the burst separator is the gated burst signal; the gated burst signal represents the color synchronizing burst which has been separated from the overall color television signal. The gated burst is applied to the burst synchronized oscillator 45 which, in response to the phase and frequency information supplied by the color synchronizing burst, produces an output signal having the frequency and phase of the color synchronizing burst.

The burst synchronized oscillator 45 delivers one signal to the plus-minus Q demodulator 53; utilizing the phase shifter 47 the burst synchronized oscillator 45 delivers a second signal to the plus-minus I demodulator 55. These signals as delivered to the plus-minus Q demodulator 53 and the plus-minus I demodulator 55 have respective phases suitable for demodulating the I signal and Q signal. In the form of the invention as described in connection with Figure 1 filtering of the demodulated I and Q signals may be included in the operation of the plus-minus Q demodulator 53 and the plus-minus I demodulator 55; the Q signal is filtered to have a frequency band from approximately zero to ½ mc. and the I signal having a frequency band from approximately zero to 1½ mc. Note that the delay line 68 is included in conjunction with the plus-minus I demodulator 55 to provide suitable time delay so that the operation of the Q channel, the I channel and the luminance channel will all have proper and matched time delay.

The fourth branch into which the signal issues from the color television signal receiver 35 is the luminance channel. This channel processes the color television signal in this case, the Y signal, which is passed through the delay line 51 and applied simultaneously to the red adder and D.-C. restorer 57, the green adder and D.-C. restorer 59, and the blue adder and D.-C. restorer 61. Utilizing the relationships described in Equations 10, 11, and 12, the positive and negative versions of the I and Q signals as produced by what will hereinafter be termed the plus-minus Q demodulator 53, and the plus-minus I demodulator 55 are supplied to the red adder 57, the green adder 59, and the blue adder 61 so that red, green and blue signals are produced which are supplied to appropriate control grids of the kinescope 63.

Consider now in detail the operation of the plus-minus I demodulator 55 which represents one embodiment of the present invention. The I phase subcarrier signal is delivered by the phase shifter 47 to the signal 69 which supplies this terminal to the coil 71. This coil 71 is coupled to the resonant circuit 77 which resonates at the frequency of the color subcarrier and produces a +I phased subcarrier signal at the terminal 85 and a −I phase subcarrier signal at the terminal 83. The +I phased subcarrier signal produced at the terminal 85 is impressed at the anode of the diode 79 with the −I phased subcarrier signal produced at the terminal 83 impressed on the cathode of the diode 81. The diode 79 and the diode 81 are connected utilizing the respective bias networks 87 and 89 to the RC network composed of the condenser 92 and the resistor 94 which is coupled to ground. The output of the RC network composed of the condenser 92 and the resistor 94 is coupled through a low pass filtering system 93 to the positive output terminal 97.

The chrominance information or chroma signal which is the color television signal in its filtered form as supplied by the chrominance filter 49 and passed through the delay line 68 is applied to the input terminal 67 of the plus-minus I demodulator 55. This chrominance information is then passed through the resonant circuit 73, through the RC network made up of the condenser 90 and the resistor 91, to the terminal 75 which is at the mid terminal of the resonant circuit 77. Note that the mid terminal 75 is coupled through the low pass filtering network 95 to the output terminal 99 at which terminal will be produced the negative version of the demodulated I signal. Note also that the RC networks utilizing respectively the condenser 94 and resistance 92 and the condenser 90 and resistance 91 are coupled serially between the anode of diode 79 and cathode of diode 81 and the cathode of diode 79 and anode of diode 81 with the midconnection of the RC networks connected to ground.

Consider now the operations which take place within the plus-minus I demodulator 55 which causes the circuit to perform the functions which are associated with the teachings of the present invention. The chroma signal passes through the resonant circuit 73, through the condenser 90 and is impressed at the mid terminal 75 of the resonant circuit 77. Because a positive I phased subcarrier signal is applied to the terminal 85 and a minus I phased subcarrier signal is applied to the terminal 83, the diode 79 and the diode 81 are caused to conduct simultaneously and acts as a gate to thereby sample the envelope of the chrominance modulated color subcarrier. At the time corresponding to the peak of the I phased color subcarrier signal the envelope information yielded during the sampling of the envelope at the peak phase corresponding to the I signal subcarrier is then produced across the RC network made up of the condenser 92 and the resistor 94, with the terminal 96 maintained positive with respect to ground. The action of the diodes will cause the flow of electrons to the condenser 92 and the condenser 90 is such that electron flow through the condenser 92 causes a positive version of the voltage to appear at the terminal 96, a corresponding negative version of the sampled envelope information will be developed across the condenser 90 and then appear at the mid terminal 75. The sampled envelope information appearing at the terminals 96 and 75 then constitute the demodulated positive I and negative I information; the positive version of the I information is passed, as has been mentioned, through the low pass filter circuit 93 to eliminate the signal components in the color subcarrier region and is applied to the output terminal 97 which represents the source of the positive version of the I signal. The mid terminal 75 at which appears the negative version of the sampled envelope information which corresponds to the negative version of the I signal then is passed through the low pass filter circuit 95 and caused to appear at the output terminal 99.

To cause optimum operation of the plus-minus I demodulator 55 it is convenient, for the retention of proper frequency response, to specify that the time constants of the circuit made up of the condenser 90 and the resistor 91 should be equivalent to that of the circuit made up of the condenser 92 and the resistor 94. In addition, in applications where the positive and negative versions of the I signal are not dissimilar in amplitude, it is convenient to have the magnitudes of the resistor 91 and the condenser 90 substantially equivalent to the magnitudes of the condenser 92 and the resistance 94. It follows too that the time constants of either the RC network made up of the condenser 90 and the resistance 91, or the RC network made up of the condenser 92 and the resistance 94 should be commensurate with the demodulation demands made by the frequencies involved in the I signal information.

To summarize, the plus-minus demodulator 55 in Figure 1 includes two rectifiers or diodes 79, 81 connected in a balanced arrangement with output terminals 75 and 96 across which demodulated signals can be developed. (The terminal 75 is an input terminal for the chrominance signal, and an output terminal for the negative polarity demodulated signal.) A first decay network or RC network or negative polarity output circuit 90, 91 is connected from the output terminal 75 to a point of reference potential such as ground through the tuned chrominance input circuit 73. The output terminal 75 is coupled through a low-pass filter 95 to provide a filtered negative output signal at terminal 99. A second decay network or RC network or positive polarity output circuit 92, 94 is connected from the output terminal 96 to a point of reference potential such as ground. The output terminal 96 is coupled through a low-pass filter 93 to provide a filtered positive output signal at terminal 97.

The chrominance signal is coupled from the chrominance input terminal 67 to the diodes 79, 81 via an input circuit including the resonant circuit 73, the negative polarity output circuit 90, 91 and the resonant circuit 77. It will be noted that since the chrominance signal is applied in the same phase or polarity to the anode of diode 79 and the cathode of diode 81, the diodes tend to be alternately conductive in response to the chrominance signal. The demodulating reference oscillations at 3.58 megacycles from the burst synchronized source 45, 47, 69 are coupled to the diodes 79, 81 via primary coil 71 and secondary coil 78. It will be seen that, since the centertap 75 on the secondary coil is returned to ground, and since one side of secondary coil 78 is connected to the anode of diode 79 and the other side is connected to the cathode of diode 81, the reference oscillations are applied to the diodes in such polarities that both diodes tend to be conductive and non-conductive at the same instants in time in response to the reference demodulating oscillations. Diodes 79 and 81 are provided with respective bias networks 87 and 89 which develop self biases for the diodes so that the diodes conduct only on the peaks of the larger of the two input signals. The input demodulating reference oscillation signal is preferably made larger in amplitude than the input chrominance signal. The outputs of the balanced double-diode demodulator 55 are then unaffected by changes which may occur in the amplitude of the input demodulating oscillations.

The plus-minus I demodulator 55 has another advantage in addition to its simplicity and the effectiveness and straight-forward fashion by which both positive and negative polarity versions of the demodulated color difference signals are produced. This advantage is that the system is D.-C. coupled so that D.-C. restoration is not necessary in the succeeding circuit provided that the philosophy and techniques employed in circuits which retain D.-C. coupling are employed.

Figure 2:
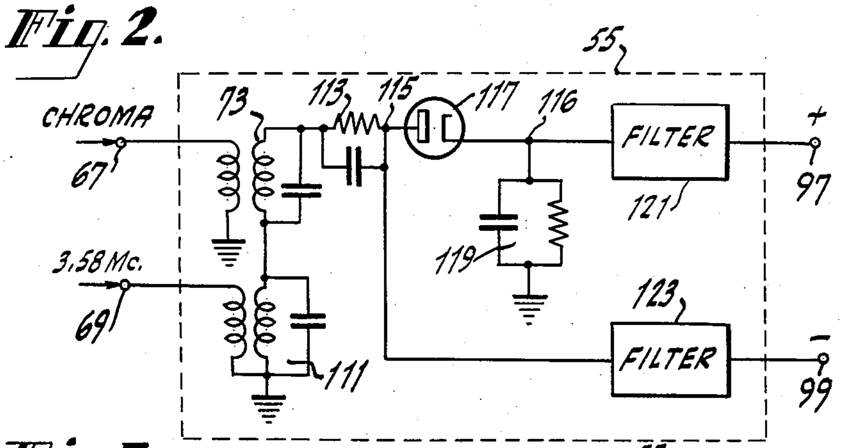
Figure 2 shows a plus-minus single diode demodulator which employs the teachings of the present invention.
Figure 3:
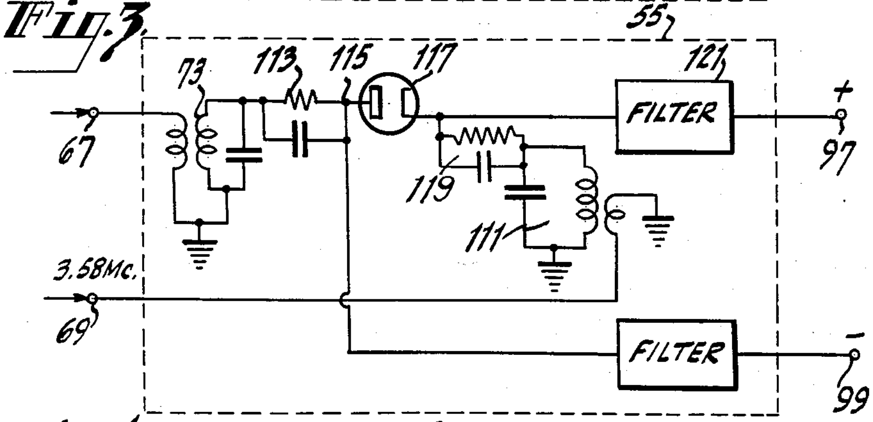
Figure 3 shows another version of the plus-minus single diode demodulator circuit.
Figure 4:
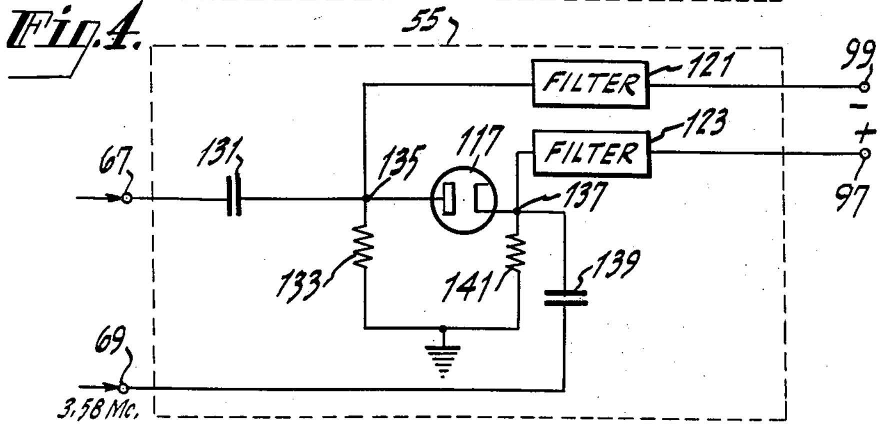
Figure 4 shows still another type of plus-minus single diode type of demodulator circuit.

When the advantages of having the two-path type of plus-minus demodulator circuit shown in Figure 1 are not necessary, it may be convenient to resort to single diode plus-minus demodulator circuits of the type shown in Figures 2, 3 and 4.

As is shown in Figure 2, the chroma as applied to the input terminal 67 of the plus-minus I demodulator 55 develops a voltage across the network 73. The local oscillator signal from the phase shifter 47 is impressed at the input terminal 69 with this signal developed across the network 111. The network 111 and network 73 are connected in series with one end connected to ground and the other end coupled by way of the RC circuit 113 to the anode terminal 115 of the diode 117. The cathode of the diode 117 is connected through the RC network 119 to ground. In the manner described in connection with the plus-minus I demodulator 55 shown in Figure 1, the action of the RC circuits and the chroma voltage and local oscillator voltage of the circuit shown in Figure 2 cause sampling of the envelope of the chroma subcarrier wave in a manner which produces demodulation of the particular color difference signal corresponding to the phase of the local oscillator signal applied to terminal 69 with the positive polarity version of the demodulated signal appearing at the terminal 116 and the negative polarity version of the signal appearing at the anode terminal 119. Utilizing the filters 121 and 123 the chroma subcarrier information may be filtered from the outputs to yield the filtered plus and minus versions of the demodulated color-difference signal at the output terminals 97 and 99 respectively.

Figure 3 shows a slight modification of the circuit shown in Figure 2 wherein the chroma as applied to the input terminal 67 is caused to be applied to the anode terminal 115 with the local oscillator signal as applied to the input terminal 69 caused to excite the network 111 which impresses this local oscillator signal on the cathode of the diode 117. Plus-minus action will still be accomplished and, utilizing the filters 121 and 123 the plus and minus versions of the demodulated color subcarrier will appear at the output terminals 97 and 99 respectively.

Figure 4 shows another type of connection of the RC circuits involved in the plus-minus single diode demodulator type of circuit. Here, the chroma subcarrier as applied to the input terminal 67 is applied to the anode of the diode 117 utilizing the resistance 133 and the condenser 131. The local oscillator signal is applied to the terminal 69 which impresses this information across the condenser 139 which is in series with the resistor 141. The terminal 137 which represents the connection between the condenser 139 and the resistance 141 is applied to the cathode of the diode 117. Envelope sampling action of the chroma subcarrier will then take place at the phase prescribed by the local oscillator signal which is being applied to the input terminal 69. The negative polarity version of the demodulated signal will be produced at the terminal 135 as a result of charges built up across the condenser 131 and the positive polarity version of this signal will be produced at the terminal 137 due to the variation in the charge appearing across the condenser 139. Utilizing the filtered circuits 121 and 123, the filtered demodulated color-difference signal will then appear in its positive form and its negative form at the output terminals 97 and 99 respectively.

Having described the invention, what is claimed is:

1. In a color television system, the combination of, a source of a chrominance signal consisting of a color subcarrier which is amplitude modulated at different phases with different color information, a source of demodulating reference oscillations having the same frequency as said color subcarrier, first and second output terminals, a first diode and a first bias network connected in series between said output terminals, a second diode and a second bias network connected in series between said output terminals, said diodes being oppositely poled, means to couple said chrominance signal to said diodes with polarities tending to make said diodes conduct at different times, means to couple said source of reference oscillations to said diodes with polarities tending to make said diodes conduct at the same times, a first output circuit coupled from said first output terminal to a point of fixed reference potential, and a second output circuit coupled from said second output terminal to said point of fixed reference potential, said output circuits each consisting of an impedance network having a low impedance to frequencies in the region of said input signal source and having a high impedance to the color information modulation frequencies on said color subcarrier, whereby opposite polarity versions of a demodulated color information signal are provided at said two output terminals.

2. In a color television system, the combination of, a source of a chrominance signal consisting of a color subcarrier which is amplitude modulated at different phases with different color information, a source of demodulating reference oscillations having the same frequency as said color subcarrier, a series circuit path from a point of reference potential including in the order named a first output circuit, two rectifiers connected in parallel, and a second load circuit returned to said point of reference potential, said load circuits each consisting of an impedance network having a low impedance to frequencies in the region of said color subcarrier and having a high impedance to the color information modulation frequencies on said subcarrier, means to couple the output of said source of chrominance signal to said rectifiers with polarities tending to make said rectifiers conduct at different times, means to couple the output of said source of demodulating reference oscillations to said rectifiers with polarities tending to make said rectifiers conduct at the same times, means to derive a demodulated color information signal of one polarity from the rectifier side of said first load circuit, and means to derive the same demodulated color information signal but of opposite polarity from the rectifier side of said second load circuit.

3. In a color television receiver including a source of a chrominance signal comprising modulated color subcarrier waves, and a source of reference oscillations of color subcarrier frequency, a color demodulator comprising the combination of a rectifying device including a first electrode and a second electrode, said rectifying device providing a unidirectional current path between said first and second electrodes; a first time constant network comprising a first resistance, a first capacitance, and means for effectively connecting said first capacitance in shunt with said first resistance, said first time constant network being coupled between said first electrode of said rectifying device and a point of reference potential; a second time constant network comprising a second resistance, a second capacitance, and means for effectively connecting said second capacitance in shunt in said second resistance, said second time constant network being coupled between said second electrode of said rectifying device and said point of reference potential; means coupled to said first named source for applying said chrominance signal across said unidirectional current path; means coupled to said second named source for applying said reference oscillations across said unidirectional current path; means including a first low pass filter having a cut-off frequency below said color subcarrier frequency and coupled to said first electrode for deriving a color difference signal output from the voltage developed across said first time constant network; and means including a second low pass filter having a cut-off frequency below said color subcarrier frequency and coupled to said second electrode for deriving an opposite polarity version of said first named color difference signal output from the voltage developed across said second time constant network.

4. A color demodulator in accordance with claim 3 wherein the time constant of said first time constant network is substantially equal to the time constant of said second time constant network.

5. A color demodulator in accordance with claim 3 wherein said first and second resistance are substantially equal in value, and wherein said first and second capacitances are substantially equal in value.

6. Apparatus in accordance with claim 3 wherein said color demodulator also includes a second rectifying device including a first and a second electrode, said second rectifying device providing a unidirectional current path between said first and second electrodes, and means for shunting the unidirectional current path of said second rectifying device across the unidirectional current path of said first rectifying device such as to provide an oppositely poled current path in shunt therewith.

References Cited in the file of this patent

UNITED STATES PATENTS 2,718,546 Schlesinger ------------ Sept. 20, 1955